United States Patent
Gnanasambandam et al.

(10) Patent No.: US 8,364,728 B2
(45) Date of Patent: Jan. 29, 2013

(54) METHOD AND SYSTEM FOR A DISTRIBUTED FILE SYSTEM BASED ON USER BEHAVIORS AND USER LOCALES

(75) Inventors: Shanmuga-nathan Gnanasambandam, Webster, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1009 days.

(21) Appl. No.: 12/362,163

(22) Filed: Jan. 29, 2009

(65) Prior Publication Data
US 2010/0188689 A1 Jul. 29, 2010

(51) Int. Cl.
*G06F 17/30* (2006.01)
(52) U.S. Cl. .......................... 707/812; 707/966
(58) Field of Classification Search ................. 707/812, 707/899, 966
See application file for complete search history.

(56) References Cited

U.S. PATENT DOCUMENTS

| | | | |
|---|---|---|---|
| 7,043,522 B2 * | 5/2006 | Olson et al. .................... 709/202 |
| 7,254,464 B1 | 8/2007 | McLurkin et al. | |
| 7,305,371 B2 | 12/2007 | Brueckner et al. | |
| 7,409,459 B2 * | 8/2008 | Bejerano et al. ............... 709/239 |
| 7,505,172 B2 * | 3/2009 | Vondran et al. ................. 358/1.9 |
| 7,770,162 B2 * | 8/2010 | Liu et al. ........................ 717/151 |
| 7,831,472 B2 * | 11/2010 | Yufik ............................ 705/14.4 |
| 7,945,565 B2 * | 5/2011 | Poblete et al. ................. 707/722 |
| 8,082,532 B1 * | 12/2011 | Stenz et al. .................... 716/123 |
| 8,166,029 B2 * | 4/2012 | Park et al. ...................... 707/732 |
| 2003/0079198 A1 * | 4/2003 | Yamamoto ....................... 716/13 |
| 2004/0030768 A1 * | 2/2004 | Krishnamoorthy et al. .. 709/223 |
| 2007/0146773 A1 | 6/2007 | Harrington et al. | |
| 2007/0260716 A1 | 11/2007 | Gnanasambandam et al. | |
| 2008/0082933 A1 | 4/2008 | Howard et al. | |
| 2008/0222154 A1 | 9/2008 | Harrington et al. | |
| 2009/0044106 A1 * | 2/2009 | Berkner et al. ................ 715/273 |
| 2010/0145771 A1 * | 6/2010 | Fligler et al. .................... 705/10 |
| 2010/0149572 A1 * | 6/2010 | St. Jacques et al. .......... 358/1.13 |

* cited by examiner

*Primary Examiner* — Jorge A Casanova
(74) *Attorney, Agent, or Firm* — Fay Sharpe LLP

(57) ABSTRACT

A method and system including a plurality of multifunction devices (MFDs), the method and system further including a storage station having geographically separated MFDs for permitting users to store information generated by the plurality of MFDs in operable communication with the locale aware DFS; wherein the information is stored on a plurality of storage stations based on a weighted undirected graph generated from a plurality of dynamically monitored user behaviors, required level of replications, and selection rules to pick the points of storage.

31 Claims, 6 Drawing Sheets

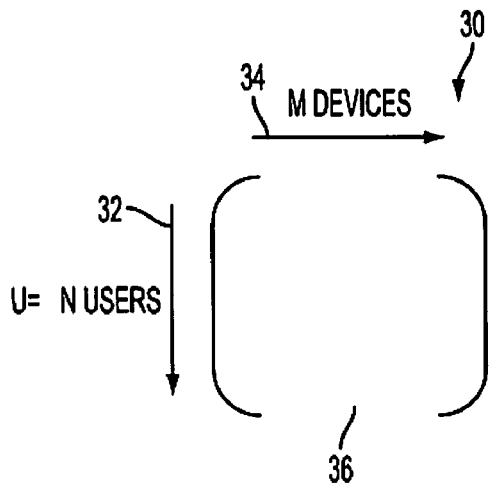

Algorithm 1 Weighted Undirected Graph Generation Algorithm

Input: user set $A$ of size $N$, device set $B$ of size $M$, usage matrix $U$ with integer entries with units of selections/user.

Output $G(V, E)$ and real edge weights $W(e), e \in E$ (1) From $U$, eliminate users that have only one entry against a device in the $U$ matrix.

(2) For every row $i$ in $U$ ($i$ ranges from 1 to $N$), divide each entry by the row sum $r = \sum_{p=1}^{M} U(i, p)$ to result in matrix $P(U)$.

(3) For each row $i$ in $U$, pick columns that have non-zero entries in $P(U)$ and connect them pairwise in that row exhaustively. This gives rise to $G(V, E)$. Note that $G$ may be segmented and/or have a giant component.

(4) Once the graph $G$ is obtained, pick an edge $e \in E$. From $P(U)$ determine the set of users $A'$ that caused the edge $e$ by checking the corresponding entires in $P(U)$. Each user that is identified will have a row with his own row index $i$ in matrix $P(U)$. If the edge is between the device pair $(k, l)$ and the row being considered is $i$, compute the edge weight as $w^i(e) = avg(P(U)(i,k), P(U)(i,l))$.

(5) Continue this process for $\forall i \in A'$ for that edge $e \in E$ between device pair $(k, l)$. Let $t$ denote the $t^{th}$ entry in the row set $A'$. Therefore each time update the aggregated edge weights as $\phi^{A'(t)}(e) = ((t-1)\phi^{A'(t-1)}(e) + w^{A'(t)}(e))/t$, where $\phi^t(e)$ denotes the aggregated edge weights upto $t$ with $A'(0) = 0$. Steps 4 and 5 are repeated for every edge $e \in E$.

(6) Output the weights set $W(e)$ for all edges taking into account all users and their preferences (i.e. the aggregated $\phi$ values for each edge). Output $G(V, E)$.

FIG. 3B

METHOD AND SYSTEM FOR A DISTRIBUTED FILE SYSTEM BASED ON USER BEHAVIORS AND USER LOCALES

BACKGROUND

1. Field of the Related Art

The present disclosure relates to distributed file systems, and more particularly, to a method and system for manipulating user behaviors and user locales to store information in a distributed file system.

2. Background of the Related Art

In general, a multifunction device (MFD) operates as a plurality of different imaging devices, including, but not limited to, a printer, copier, fax machine, and/or scanner. In recent years the basic office copier has evolved into what can be referred to as a MFD. With digital technology, a machine with the basic outward appearance of a traditional copier can perform at least the additional functions of printing documents submitted in digital form over a network, sending and receiving messages via facsimile, recording hard-copy original images in digital form and sending the resulting data over a network, such as in electronic mail, temporarily storing files on their hard-disk, and/or recording hard-copy original images in digital form on a compact disc or equivalent medium.

In the area of digital printing and copying, there has been a growth in demand for MFDs. Such MFD devices may assume the form of an arrangement in which a single print engine (e.g., xerographic or thermal ink jet print engine) is coupled with a plurality of different image input devices (or "services"), with such devices being adapted to produce image related information for use by the printer or transmitted over a network. The image related information, in one example, could have its origin in video facsimile signals, microfilm, data processing information, light scanning platens for full size documents, aperture cards, and microfiche. MFDs provide a broader range of functionality than traditional single-function devices, such as dedicated printers, copiers, and scanners. As a result, because of their network transmission and storage capabilities combined with their functionality, it would be useful to monitor behavioral patterns and locations of users handling MFDs. It would also be helpful to use the concept of stigmergy to monitor behavioral patterns and locations of users handling MFDs.

"Stigmergy" is typically defined as communication through the environment, which allows the coordination of actions between several objects. For example, "Object A" can communicate with "Object B" using stigmergy when Object A marks the environment in a way that Object B can detect. Stated in different terms, stigmergy is based on sensing and sampling the environment and responding to it. The concept of stigmergy was introduced to describe the indirect communication taking place among individuals in social settings.

In chaos theory, stigmergy is an agent's use of the environment to communicate and interact. If there is more than one agent interacting with the environment (which may include other agents) then this may be considered a swarm. If there is additional behavior that occurs from the interaction of the agent with its environment that is not directly predictable from the activity of the individual agents then this is emergent behavior. The capability of self-organization is required if any emergent behavior, beneficial or not, is to arise from the swarm.

There are two types of self-organization. The first occurs as a consequence of the random activity of the agents while the second type only requires locally directed interaction. Both self-organization types eliminate the need for external control as all control activity originates from the agent interacting with its environment. Emergent behavior is the direct result of interaction between multiple individual agents and their environment. Each individual agent's environmental reactions, i.e., the behaviors of an agent are a function of the individual agents' internal state. The concept of stigmergy, however, has not been expanded to the field of MFDs where users interact as a swarm with MFDs.

As a result, in conventional systems, there is no storage mechanism that takes into account the social networking taking place between MFDs that could be defined on the basis of collected usage characteristics of those MFDs. In other words, conventional systems do not use the concept of stigmergy to store information. Instead, conventional distributed file systems have focused on storing multiple files in a replicated fashion on resources that have certain performance or availability characteristics. In such systems, structured overlays are architected to collect and maintain information so that a required number of replications of a file can be calculated to achieve a desired goal (e.g., such as average file hit-rate in the system or file availability). However, this is an inefficient and time-consuming process.

Thus, while some conventional systems allow document sharing, such document sharing mechanisms usually involve storing multiple files in a replicated fashion on resources that have certain performance or availability characteristics. Such systems do not manipulate user behavioral patterns and/or user locales or the concept of stigmergy.

Consequently, current systems lack the capability to effectively share documents based on dynamically changing variables, such as user behavioral patterns or users' physical locations. The present disclosure is intended to overcome the drawbacks of other methods by providing for storing information based on user behaviors and/or user locales based on stigmergy. In particular, the present disclosure relates to a system and method for manipulating user behaviors and user locales to store information.

SUMMARY

The present disclosure provides a distributed file system (DFS) having a plurality of multifunction devices (MFDs), the system including a storage station for permitting users to store information generated by the plurality of MFDs in operable communication with the DFS; wherein the information is stored in the storage station based on a weighted undirected graph generated from a plurality of dynamically monitored user behaviors.

The present disclosure also provides a method for accessing a distributed file system (DFS) having a plurality of multifunction devices (MFDs), the method including the steps of receiving information from the plurality of MFDs in operable communication with the DFS; dynamically monitoring a plurality of user behaviors; generating a weighted undirected graph based on the plurality of user behaviors; and storing the information generated by the plurality of MFDs based on the plurality of user behaviors in one or more storage stations.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein:

FIG. 3A is a schematic diagram of a usage matrix, in accordance with the present disclosure;

FIG. 3B illustrates a weighted undirected graph generation algorithm, in accordance with the present disclosure;

DETAILED DESCRIPTION

Figure 1:
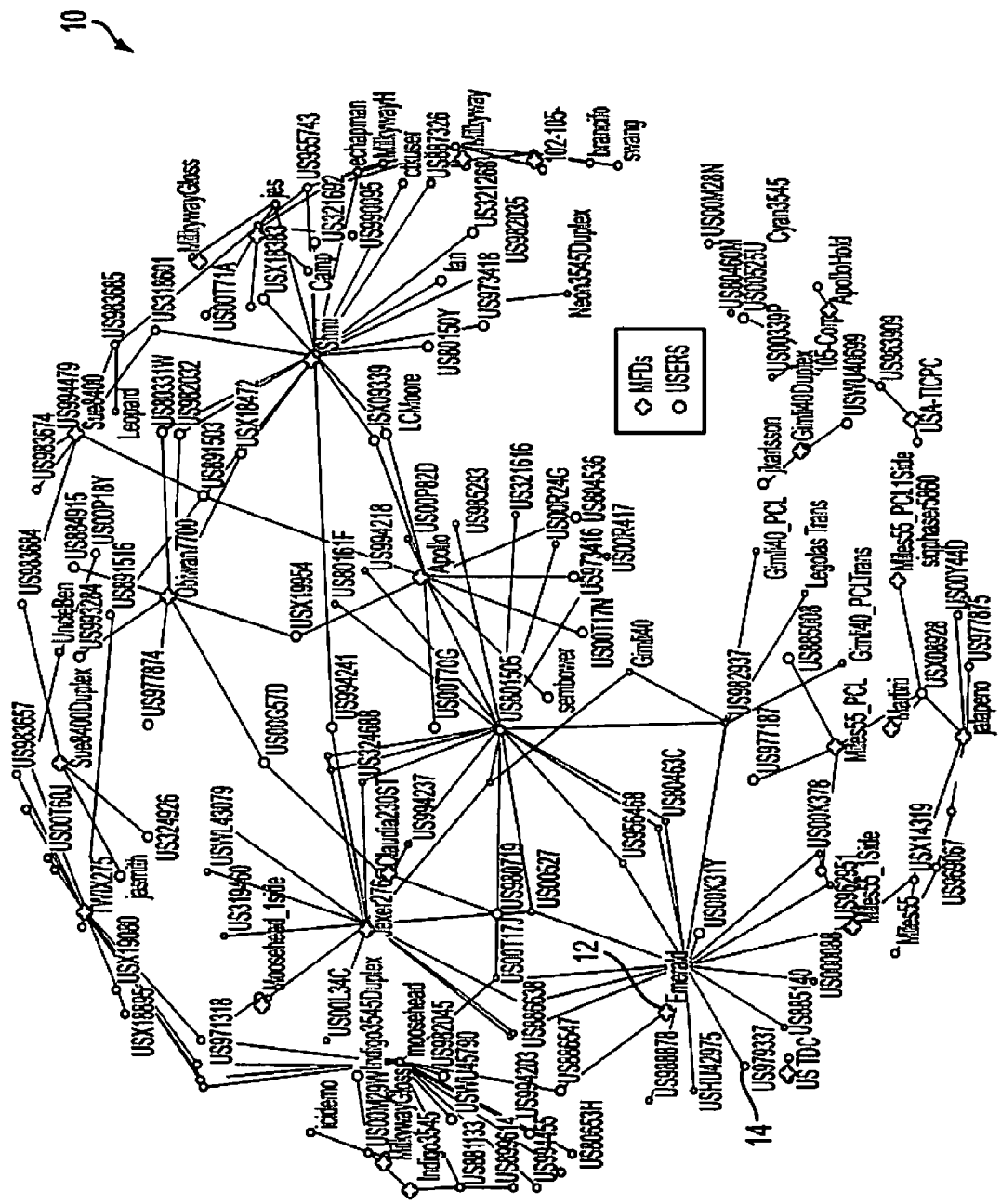
FIG. 1 is a schematic diagram of a two-mode network generated from a plurality of dynamically changing user behaviors, in accordance with the present disclosure.

The present disclosure proposes replicated storage of files on collaborating MFDs. The present disclosure describes a method and system that defines and computes a usage matrix which is a weighted undirected graph. On this graph showing the usage matrix, which is different from an Ethernet connectivity graph or proximity graph, vertices correspond to MFDs and edges are related to which MFDs users print on. Edge weights relate to what fractions of their printouts go to different printers. In other words, the weighted undirected graph is a representation of the stigmergy that all users exhibit as a whole while interacting with the MFD environment.

On the basis of this usage matrix computed dynamically by collaborating MFDs, user locales and social networks of devices are established. A locale from a user standpoint may be a set of interconnected points on the aforementioned weighted graph in which the given user prefers at least one device. By establishing rules of how to store files with the aid of this weighted graph, storage, search, and retrieval are simplified. Furthermore, since each user has a locale with respect to the aforementioned graph with most of that user's files in that specific locale, network traffic owing to retrieving files from a remote location is significantly reduced.

In conventional systems, there is no storage mechanism that factors the "social network" between MFDs. As a result, in conventional systems, there is no concept of locale dependent storage in the distributed file system domain. Another issue with such systems is representing a user-based locale in a large device network with hundreds of users, which is an issue because each user has a different locale or preferred region of operation. To translate those choices about regions into storage in a tractable way has not been successfully attempted by conventional systems. MFDs are geographically distributed in an organization making them candidates for a locale-dependent DFS. As a result, the present disclosure proposes a graph-theoretic mechanism to define and leverage/manipulate a user's locale and behavioral patterns based on stigmergy.

Thus, none of the conventional techniques utilize the "social network" of printers to formulate a strategy to store and replicate files. In other words, a given printer can take advantage of its users' behavior and location, and other printer choices users make to compute the number of file replicas and where to store them.

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

MFDs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device.

The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit.

The term "retrieval" can refer to any procedure for searching for and extracting database records or content.

The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

Moreover, concerning the distributed file system, files or portions of files (e.g., chunks) may be stored in a replicated fashion in a distributed file system. The distributed file system in the present disclosure includes at least one MFD and may have other computing devices that supply the storage medium. In addition, the term "storage station" may refer to storing one or more files in one or more locations and/or storing one file in a plurality of locations. In other words, a file may be replicated and/or split into several pieces. This is achieved by using an undirected graph (explained below).

Embodiments will be described below while referencing the accompanying figures. The accompanying figures are merely examples and are not intended to limit the scope of the present disclosure.

FIG. 1 illustrates a two-mode network, such as a printer-user network.

Specifically, with reference to FIG. 1, there is presented a schematic diagram of a two-mode network generated from a plurality of dynamically changing user behaviors, in accordance with the present disclosure. The two-mode network 10 includes at least a user 12 and a device 14. The device 14 may be a MFD.

The user 12 is permitted to access device 14, as well as a plurality of other MFDs that are in close proximity to the user 12. The two-mode network 10 includes a plurality of users and a plurality of MFDs. Each of the plurality of users is permitted to access a plurality of MFDs within a certain locale.

Figure 2:
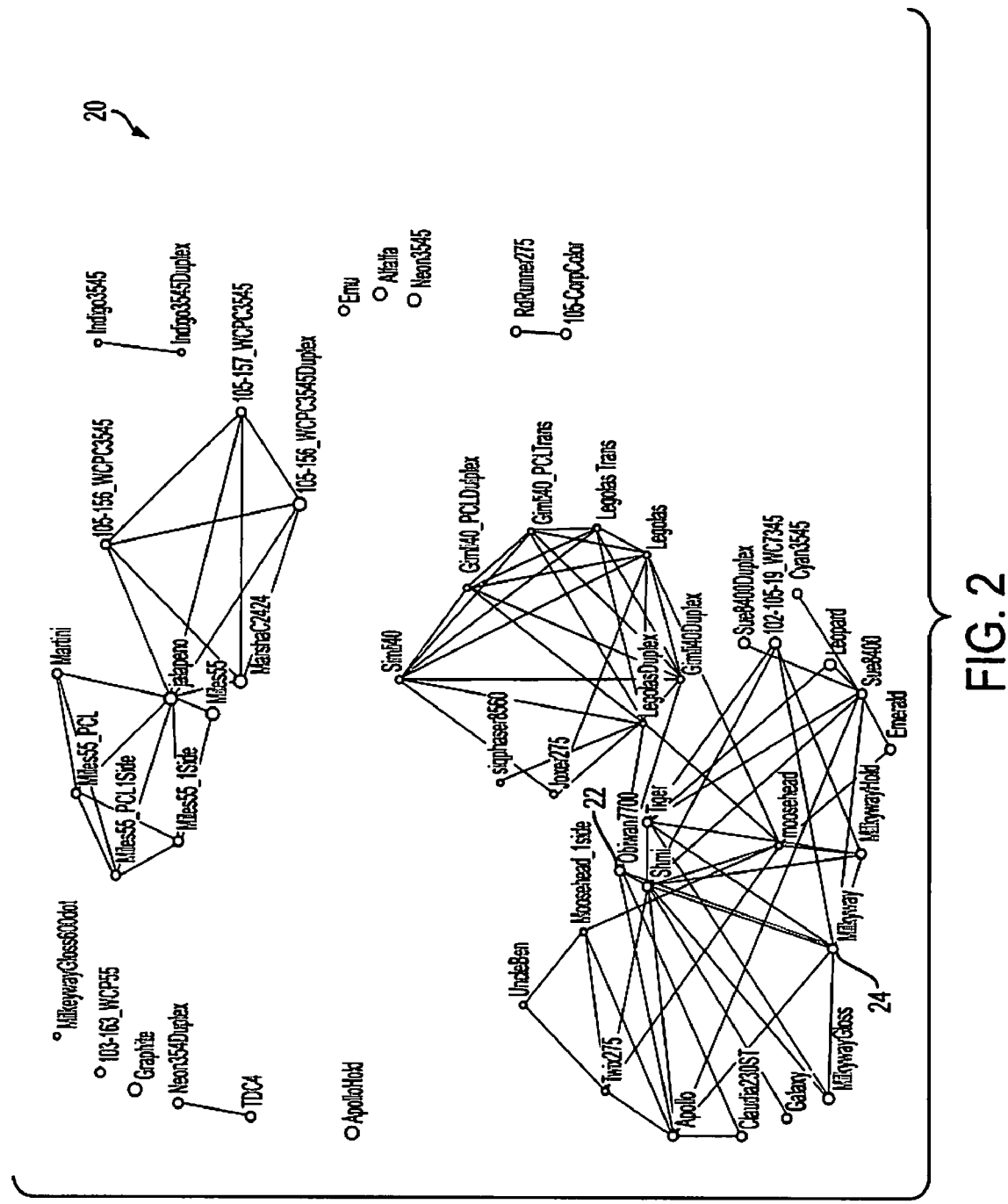
FIG. 2 is a schematic diagram of a one-mode network generated from a plurality of dynamically changing user behaviors, in accordance with the present disclosure.

FIG. 2 represents the associated social network formed by printers when users print to several devices. In other words, when the user prints to two or more devices, the proposed disclosure defines an edge between each pair of printers selected by that user (which may be printers or any other type of devices). This process is repeated for all users, so that edges are created based on the activities of all users of all the printers that are considered. The edge weights are updated upon the consideration of each new user. This is explained more below with reference to FIG. 3. The network so formed is referred to as the social network of printers or MFDs, where pre-defined interconnections between two printers leads to a network. From a given user's perspective a set of devices on the graph forms his/her locale. Because of the way these locales are computed, the user has at least one device he/she prefers. FIG. 2 compactly represents the stigmergy exhibited by users and exploits it for storage algorithms.

The present disclosure utilizes the aforementioned social network concept to architect a different kind of distributed file system which has the property of locale awareness. In other words, one can store and replicate files in a way that is closer to the users that use those files. This is quite useful in the context of distributed storage provided by MFDs as they are spread across an office and are located geographically closer to their core users as opposed to conventional storage servers concentrated in a data center. With reference to FIG. 2, there is presented a schematic diagram of a one-mode (printer) network generated from a plurality of dynamically changing user behaviors, in accordance with the present disclosure. The one-mode network 20 includes several devices. Each user may have one device that he/she prefers and this is considered the origin for that user. The device 24 may be a MFD.

The user 22 is permitted to access device 24, as well as a plurality of other MFDs that are in close proximity to the user 22. The one-mode network 20 includes a plurality of MFDs. Each user can be associated with a plurality of MFDs which can be regarded as his/her locale. Starting from the origin of a given user, the graph may be used to find devices that are close by from the perspective of locales.

With reference to FIG. 3A, there is presented a schematic diagram of a usage matrix, in accordance with the present disclosure. The usage matrix 30 includes a plurality of N users 32, a plurality of M devices 34, and a matrix 36.

At the beginning of the network generation process, a usage matrix is derived. Every node which is an MFD maintains a list of users that print to it. Since, all MFDs maintain this information, this information can be aggregated to form a usage matrix 30 having N users 32×M devices 34. The M devices 34 are of the order of hundreds and the N users 32 are of the order of thousands.

With reference to FIG. 3B there is presented a weighted undirected graph generation algorithm, in accordance with the present disclosure. The algorithm 38 is an exemplary algorithm for generating a weighted undirected graph.

In step 1, users that have one entry are discarded. The remaining users are included in the subsequent calculations. In step 2, the matrix is normalized. In step 3, the graph G is obtained where V is a set of vertices belonging to G, and E is a set of edges belonging to G. Steps 4-6 determine the weights of the graph. In steps 4 and 5, the set of users associated with a pair of MFDs is used to update the weights. Step 4 illustrates how a single average weight is calculated. Steps 4 and 5 are repeated until all edges in FIG. 2 are exhausted. In other words, the computation ends for the first edge, and the process begins again for a second edge, and then a third edge, and so forth until all the edges have been completed. In step 6, the output is generated, which is the weights of all edges of the graph computed in steps 4 and 5.

Lemma: The edge between two arbitrary devices among whom print volume is shared by a set of users has an edge weight $\alpha \leq 0.5$ under an averaging function $avg(p, q)=p+q/2$.

Proof: For any two arbitrary devices d1 and d2,

Case 1: If all the users (say set N') of these two devices d1 and d2, print only to these devices the aggregated edge weight is a mathematical sum equal to 0.5 where the sum is related to one fraction that is printed on d1 and another fraction that is printed on d2. Note since all users of these two devices do not print to any other device this pair of devices will not be connected to any other device in the one-mode graph.

Case 2: If there are some users that print to devices d1 and d2 in addition to printing on some others, then at least one average edge weight for the d1$d$2 pair is less than 0.5. Because of this reason, the aggregated edge weight, which is the average of averages will be less than 0.5 for the d1$d$2 pair. As a result, there will be edges to other devices from devices d1 and/or d2.

Concerning the finding of locale-aware storage points for users of MFDs, one may first note that the present disclosure is considering a DFS for storing print jobs or other content relating to MFD-oriented services. This is different from conventional file storage of a PC or other traditional backup services. As detailed above, the usage matrix and associated weighted graph is identified, and then one has to determine a way to store and replicate a given file on this graph. The present disclosure determines a path or region on the graph where the file replicas or portions are stored. Since the graph is based on the locations and printing habits of users, the locations of files and their replicas tend to be closer to its users. It is assumed that the numbers of replicas for a given file is known to the user or are defaulted to system-wide constant (e.g., 3 replicas per file; other contemporary DFSs such as Google file system and Hadoop use 3 as default). Note also that when all the edge weights are equal, which is a special case in the absence of preference data, a slightly different file allocation is still feasible using the same undirected graph. Instead a choosing path with highest weights (as is the case when weights are present), any path may be selected with equal likelihood.

Figure 4:
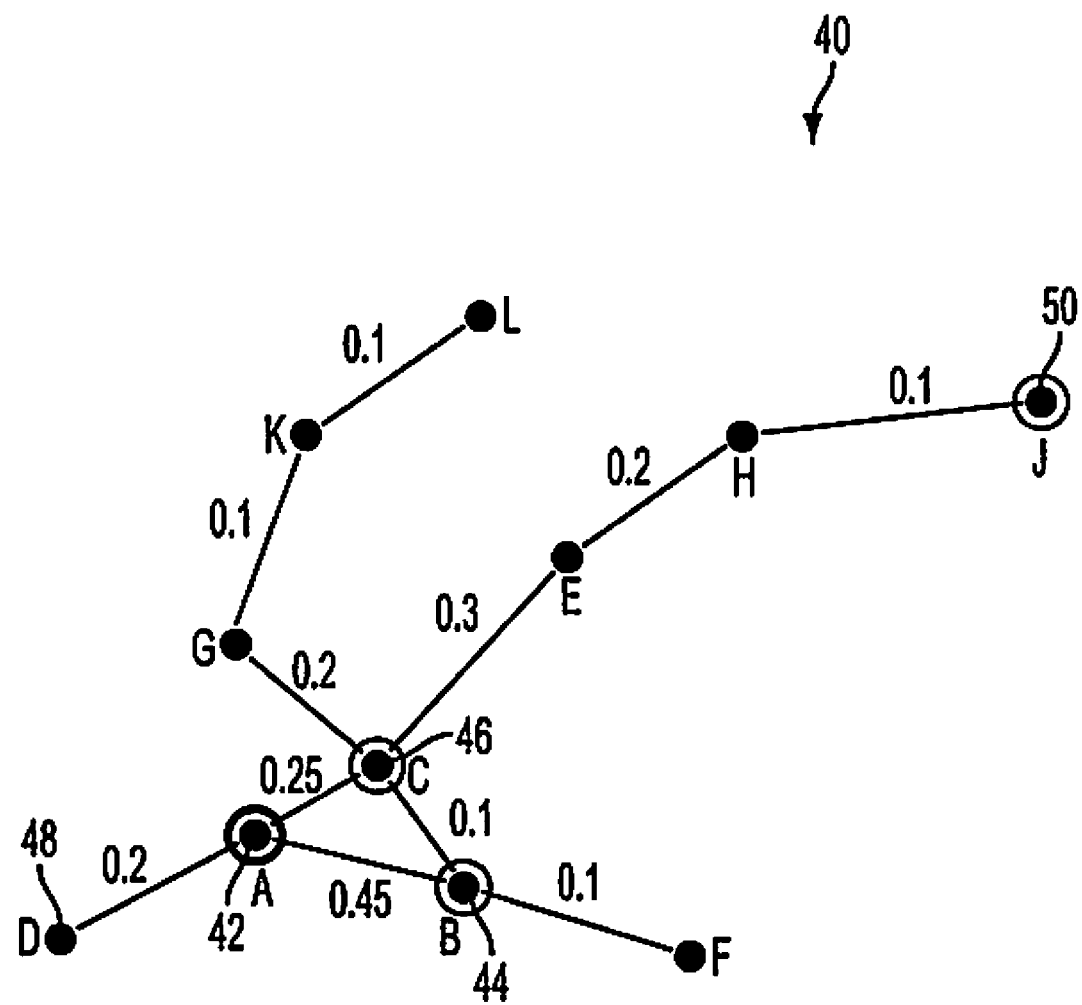
FIG. 4 is a schematic diagram of a distributed file system including a plurality of MFDs in a network graph configuration, in accordance with the present disclosure.

With reference to FIG. 4, there is presented a schematic diagram of a distributed file system including a plurality of MFDs in a network graph configuration, in accordance with the present disclosure. The usage matrix 40 includes, for example, MFD A (42), MFD B (44), MFD C (46), MFD D (48), and MFD J (50).

A typical process of FIG. 4, which is an exemplary embodiment of a weighted undirected graph, can be described as follows:

The process commences with a known user who prints or uses an MFD A (42).

The associated file is first stored on the MFD A (42).

MFD A (42) uses the usage matrix to find other locations of storage. Some MFDs could be near and others a little far away on the weighted undirected graph.

The nearer MFDs are identified as 1 hop MFDs with high edge weight. The farther node on which to store is identified by walking a few edges away from MFD A (42) using the path of highest edge weight in every hop.

The number of edges walked away from MFD A (42) could be pre-configured. By putting a certain number of copies a little further away prevents the damage caused by a localized-blackout (i.e., all MFDs close to a user failing owing to a network problem). By default, the far node is a node that is n hops from the source node (e.g., MFD A (42)), where n is the number of replications needed. However, this is not always feasible, at which time it would be put around n hops away from the source node. By putting one replica at a pre-determined number of hops away, the average path length in terms of hops for the farther replica would be around n.

If a certain one hop MFD is full in terms of storage space (which would be rare in MFD storage devices), the present disclosure would store the data in the next hop MFD and again break ties on the basis of edge weight.

Whenever a decision on the path or hop has to be made, it is made on the basis of the sum of the weights associated with the path or the hop(s).

After the replicated storage is completed, the edge weight concerning only the primary point of storage (e.g., MFD A (42)) is updated.

In a further example, what if the user wishes to use MFD A (42) for a service and hence store a file primarily in MFD A (42). Let's assume that the default replication factor is 4. Therefore the $2^{nd}$ and $3^{rd}$ replicas would be stored on MFD B (44) and MFD C (46) respectively because of the edge weights for AB and AC. The $4^{th}$ replica would be stored on MFD J (50) as it is n=4 hops away with total path weight equal to 0.85 for AJ as opposed to 0.65 for AL. The locale for the user that primarily wants to use MFD A (42) is constituted by MFD A (42), MFD B (44), and MFD C (46) based on the graph with one node MFD J (50) at a distance of 4 hops away for fault tolerance.

Concerning the usefulness of the edge weights, since the edge weights are known and whether a given replica is primary or replicated copy is also known, the process can search in the vicinity or a certain number of hops away to find the file without a complete search. Also, since the rules determine a directed storage path, wasteful search directions can be easily discarded. Additionally, computation of the edge weights is simple and can be computed without much computational overhead on a bilateral basis.

Figure 5:
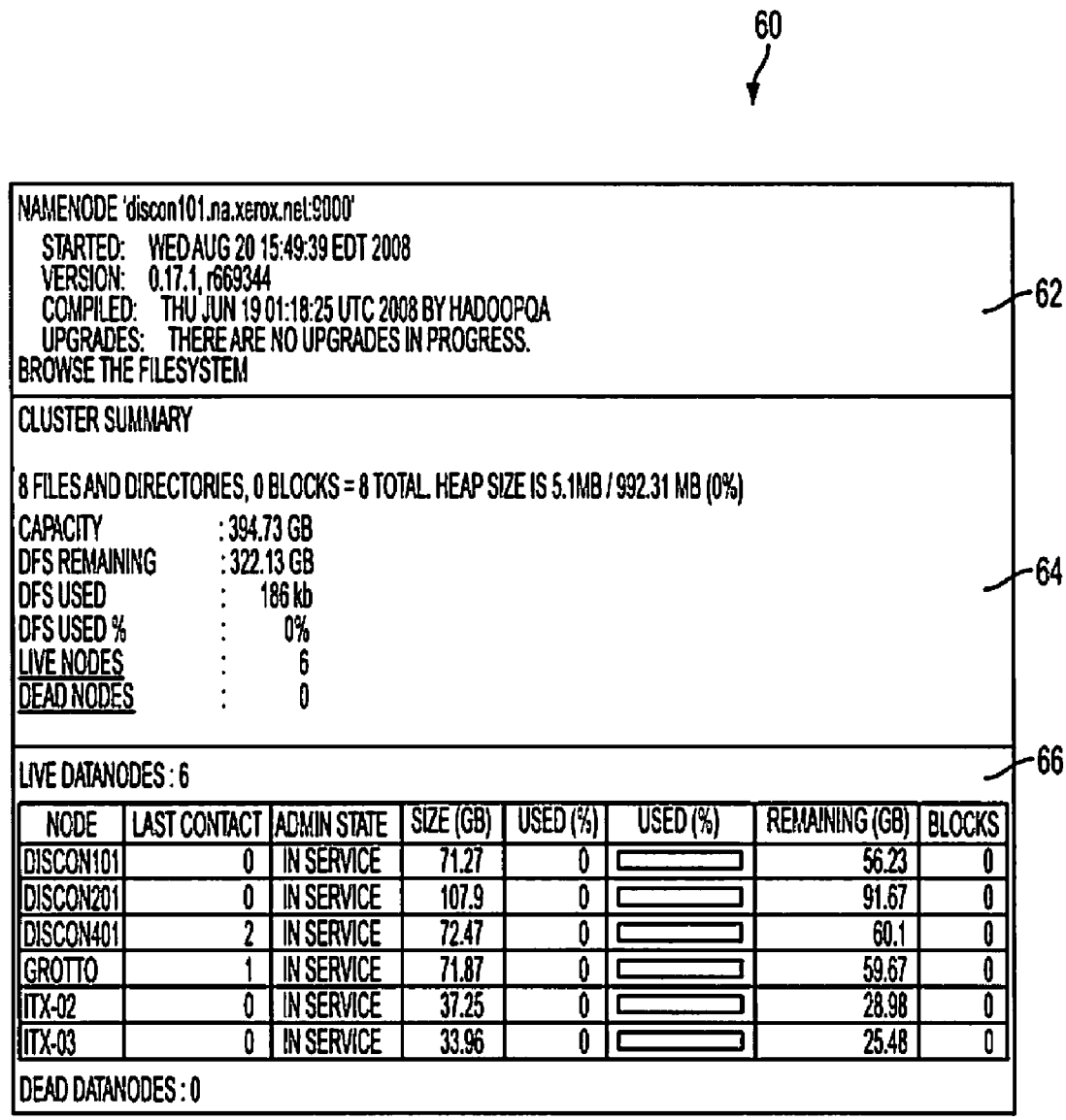
FIG. 5 is a display screen illustrating the availability of storage in a distributed file system having a plurality of MFDs, in accordance with the present disclosure.

With reference to FIG. 5, there is presented a display screen illustrating the availability of storage in a distributed file system having a plurality of MFDs, in accordance with the present disclosure. The display screen 60 includes a header portion 62, a cluster portion 64, and a node portion 66.

The header portion 62 includes, but is not limited to, the date the usage matrices are computed, the version of the software used, the date the data was compiled, and any upgrades made to the system. The cluster portion 64 includes, but is not limited to, data involving capacity, DFS remaining, DFS used, percentage of DFS used, live nodes, and dead nodes. The node portion includes, but is not limited to, the size of the MFDs, the percentage of space used on each MFD, the state of each MFD, the space remaining on each MFD, and the number of blocks.

The availability of storage in a distributed file system may be implemented by using, for example, Apache Hadoop, which will be selectively modified to include the concepts described in FIGS. 1-4. Hadoop is open source code and can be architected to compute and store the usage matrix easily. Once the usage matrix is stored, locale aware storage is achieved by one level of indirection in the replication process of Hadoop. Before each storage, data nodes in the aforementioned system would ask the "namenode" for candidates where in to store a file. At this point, the usage matrix is looked up to provide an appropriate set of nodes based on steps outlined above with respect to FIGS. 1-4. Without edge weights, which was pointed out as a special case above, the namenode could return any usage matrix node on the graph with equal likelihood.

Figure 6:
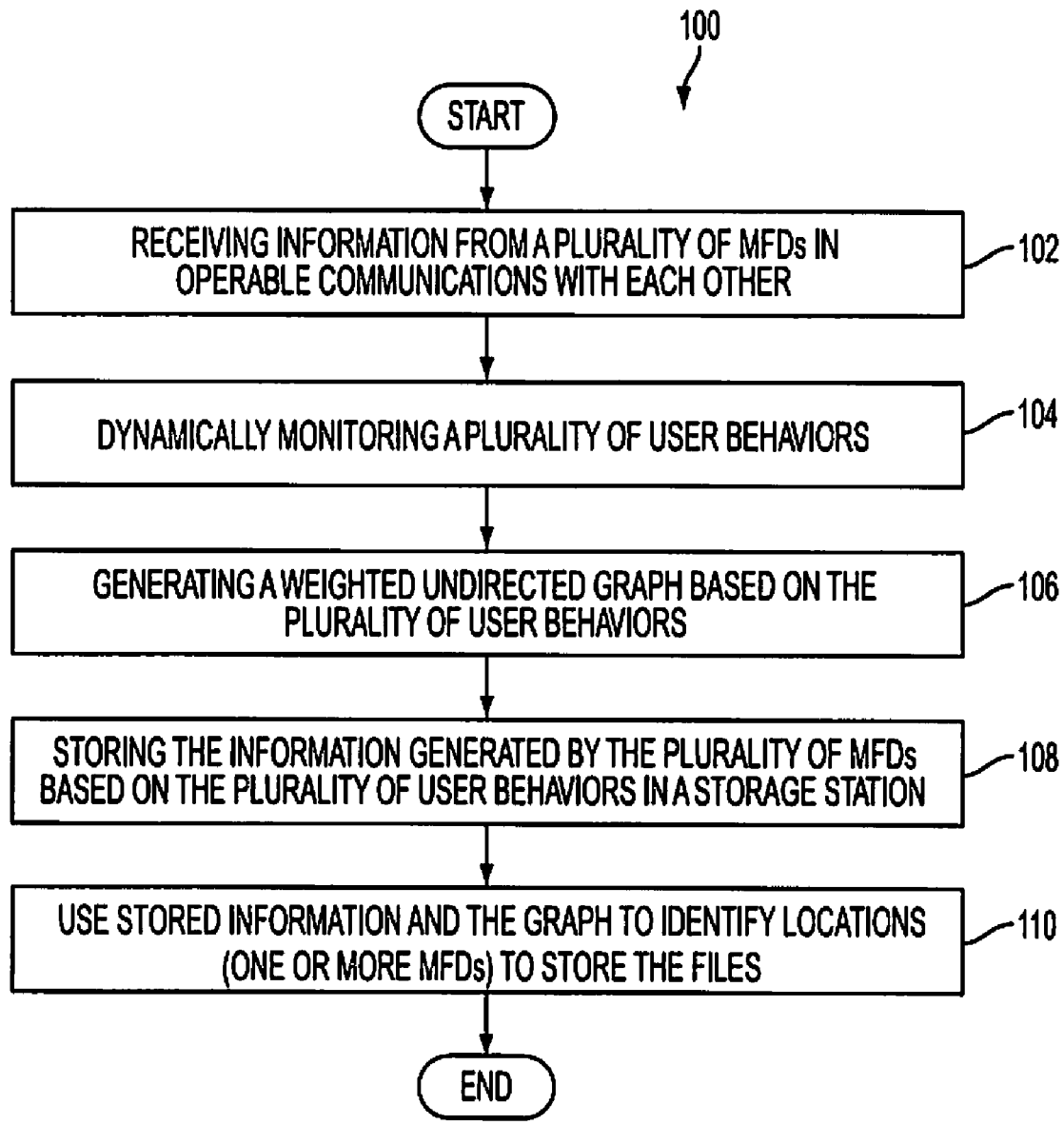
FIG. 6 is a flow chart illustrating a method for manipulating user behaviors and user locale to store information, in accordance with the present disclosure.

With reference to FIG. 6, there is presented a flow chart illustrating a method for manipulating user behaviors and user locale to store information, in accordance with the present disclosure. The flowchart 100 includes the following steps. In step 102, information is received from the plurality of MFDs in operable communication with each other. In step 104, a plurality of user behaviors are dynamically monitored. In step 106, a weighted undirected graph is generated based on the plurality of user behaviors. In step 108, the information generated by the plurality of MFDs based on the plurality of user behaviors is stored in a storage station. In step 110, the stored information and the graph are used to identify locations (one or more MFDs) to store the files. The process then ends.

The present disclosure proposes an alternative to the method in co-owned patent application 2008/0222154 by taking advantage of stigmergy, which emerges from each user's behavior towards his/her set of machines. These approaches along with the concept in co-owned patent application 2007/0146773 provide Xerox® with complementary approaches in p2p/grid storage that focus on QoS-driven (i.e., patent application 2008/0222154) and user-behavior driven storage (as described in the current application), respectively. Secondly, the concept of extracting a weighted graph to capture the stigmergy that emerges from user behavior is a general concept in that it can be used for applications other than DFS. For example, Xerox® could aggregate and cache content closer to their end users as applicable to applications like Twitter, activity streams, etc. Another example would be in job redirection when a given printer has failed based on the how a population of users interacts with a multitude of printers. Thirdly, a compact method of representing the stigmergic communication in a user-population is presented using a weighted undirected graph.

The present disclosure also includes as an additional embodiment a computer-readable medium which stores programmable instructions configured for being executed by at least one processor for performing the methods described herein according to the present disclosure. The computer-readable medium can include flash memory, CD-ROM, a hard drive, etc.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A distributed file system (DFS) having a plurality of multifunction devices (MFDs), the system comprising: a storage station including a plurality of nodes for permitting users to store information generated by the plurality of MFDs in operable communication with the DFS; wherein the information is stored in the storage station based on a weighted undirected graph generated from a plurality of dynamically monitored user behaviors; and, wherein only selected ones of the MFDs receive DFS information in accordance with the weighted undirected graph.

2. The system according to claim 1, wherein the weighted undirected graph is further generated from a plurality of dynamically monitored user locations and user interaction patterns.

3. The system according to claim 1, wherein the storage station is locale dependent.

4. The system according to claim 1, wherein a plurality of usage matrices are derived from the plurality of dynamically monitored user behaviors to generate the weighted undirected graph.

5. The system according to claim 1, wherein a plurality of interconnected points in the weighted undirected graph defines locales for a user.

6. The system according to claim 5, wherein a plurality of rules are established to store, retrieve, and search for files starting from the locale or origin of the user.

7. The system according to claim 1, wherein each of the users has a distinct origin on the weighted undirected graph representing a locale-awareness of the DFS with respect to the user.

8. The system according to claim 1, wherein the plurality of MFDs are incorporated within a networked environment.

9. The system according to claim 1, wherein a plurality of replicated files are stored on the plurality of MFDs that are geographically distributed within an organization.

10. The system according to claim 1, wherein the user behaviors include machine usage history, machine preference, and access times.

11. The system according to claim 1, wherein the weighted undirected graph includes a plurality of vertices representing the plurality of MFDs and a plurality of edges representing one or more user preference parameters.

12. A method for accessing a distributed file system (DFS) having a plurality of multifunction devices (MFDs), the method comprising: receiving information from the plurality of MFDs in operable communication with the DFS; dynamically monitoring a plurality of user behaviors; generating a weighted undirected graph based on the plurality of user behaviors; and storing the information generated by the plurality of MFDs based on the plurality of user behaviors in a storage station; and, identifying selective ones of the MFDs to receive and store selected DFS files based on the stored information.

13. The method according to claim 12, wherein the weighted undirected graph is further generated from a plurality of dynamically monitored user locations and user interaction patterns.

14. The method according to claim 12, wherein the storage station is locale dependent.

15. The method according to claim 12, wherein the storage station includes more than one MFD in the locale of the user.

16. The method according to claim 12, wherein a plurality of usage matrices are derived from the plurality of dynamically monitored user behaviors to generate the weighted undirected graph.

17. The method according to claim 12, wherein the weighted undirected graph includes a plurality of interconnected points that define unique locales with respect to each user.

18. The method according to claim 17, wherein a plurality of rules are established to manipulate the locales or store, retrieve, and search for files starting from the locale or origin of the user.

19. The method according to claim 12, wherein each of the users has a distinct origin on the weighted undirected graph.

20. The method according to claim 12, wherein the plurality of MFDs are incorporated within a networked environment having geographical separation and wherein user behavior enables definition of the user locales.

21. The method according to claim 12, wherein the user behaviors include one or more of the following: machine usage history, machine preference, access times, types of documents printed, and device capabilities used.

22. The method according to claim 12, wherein the weighted undirected graph includes a plurality of vertices representing the plurality of MFDs and a plurality of edges representing one or more user preference parameters.

23. A non-transitory computer-readable storage medium storing programmable instructions configured for being executed by at least one processor for performing a method of accessing a distributed file system (DFS) having a plurality of multifunction devices (MFDs), the method comprising:
receiving information from the plurality of MFDs in operable communication with the DFS;
dynamically monitoring a plurality of user behaviors;
using a processor, generating a weighted undirected graph based on the plurality of user behaviors; and
storing the information generated by the plurality of MFDs based on the plurality of user behaviors in a plurality of storage stations as determined using the weighted undirected graph and rules, wherein the weighted undirected graph identifies selected ones of the MFDs for receipt and storage of selected DFS information.

24. The computer-readable medium according to claim 23, wherein the weighted undirected graph is further generated from a plurality of dynamically monitored user locations and user interaction patterns.

25. The computer-readable medium according to claim 23, wherein the storage station is locale dependent and the storage station includes one or a plurality of MFDs that are interconnected on the weighted undirected graph.

26. The computer-readable medium according to claim 23, wherein a plurality of usage matrices are derived from the plurality of dynamically monitored user behaviors to generate the weighted undirected graph.

27. The computer-readable medium according to claim 23, wherein the weighted undirected graph includes a plurality of interconnected points that define locales, and wherein a plurality of rules are established to manipulate the locales and store, retrieve, and search for files starting from the locale or origin of the user.

28. The computer-readable medium according to claim 23, wherein each of the users has a distinct origin on the weighted undirected graph and locale which is a set of interconnected points near the origin.

29. The computer-readable medium according to claim 23, wherein the plurality of MFDs are incorporated within a networked environment having geographical separation and wherein user behavior enables definition of the user locales.

30. The computer-readable medium according to claim 23, wherein the user behaviors includes one or more of the following: machine usage history, machine preference, access times, type of document printed, and device capabilities used.

31. The computer-readable medium according to claim 23, wherein the weighted undirected graph includes a plurality of vertices representing the plurality of MFDs and a plurality of edges representing one or more user preference parameters.

* * * * *